аvailable

(12) United States Patent
Matsushita

(10) Patent No.: US 8,746,813 B2
(45) Date of Patent: Jun. 10, 2014

(54) VEHICLE BRAKING DEVICE

(75) Inventor: Satoshi Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/259,624

(22) PCT Filed: May 6, 2010

(86) PCT No.: PCT/JP2010/057739
§ 371 (c)(1),
(2), (4) Date: Oct. 11, 2011

(87) PCT Pub. No.: WO2010/128652
PCT Pub. Date: Nov. 11, 2010

(65) Prior Publication Data
US 2012/0038208 A1 Feb. 16, 2012

(30) Foreign Application Priority Data
May 7, 2009 (JP) ................................. 2009-112816

(51) Int. Cl.
*B60T 8/64* (2006.01)
(52) U.S. Cl.
USPC ........................................................ 303/152
(58) Field of Classification Search
USPC .................................. 303/3, 15, 152, 155, 20
See application file for complete search history.

(56) References Cited

U.S. PATENT DOCUMENTS

| 6,244,674 B1 * | 6/2001 | Kuno et al. ............... 303/152 |
| 7,136,737 B2 | 11/2006 | Ashizawa et al. |
| 8,366,210 B2 | 2/2013 | Maki et al. |

FOREIGN PATENT DOCUMENTS

| CN | 101049825 A | 10/2007 |
| JP | 55-127804 A | 10/1980 |
| JP | 59-198801 A | 11/1984 |
| JP | 10-329681 A | 12/1998 |
| JP | 2004-196064 A | 7/2004 |
| JP | 2006-103630 A | 4/2006 |
| JP | 2006-224768 A | 8/2006 |
| JP | 2008-110633 A | 5/2008 |

* cited by examiner

*Primary Examiner* — Bradley King
*Assistant Examiner* — Vu Q Nguyen
(74) *Attorney, Agent, or Firm* — Carrier Blackman & Associates, P.C.; William D. Blackman; Joseph P. Carrier

(57) ABSTRACT

In a vehicle capable of performing regenerative braking and fluid pressure braking, in changing from the regenerative braking to the fluid pressure braking in response to a decrease of a vehicle speed due to braking, a fluid pressure braking force is increased from 0 at a first increasing rate when the vehicle speed falls to or below a first threshold value (V1), and the fluid pressure braking force is increased at a second increasing rate, which is higher than the first increasing rate, when the vehicle speed falls to or below a second threshold value (V2), which is smaller than the first threshold value (V1). With this configuration, while occurrence of a squeal noise of a wheel cylinder can be prevented by setting the first increasing rate of the fluid pressure braking force at a small value, a required braking force can be generated without any problem by setting the second increasing rate, to be used subsequently thereto, of the fluid pressure braking force at a large value.

5 Claims, 4 Drawing Sheets

UNDER NORMAL CONDITION

UNDER ABNORMAL CONDITION

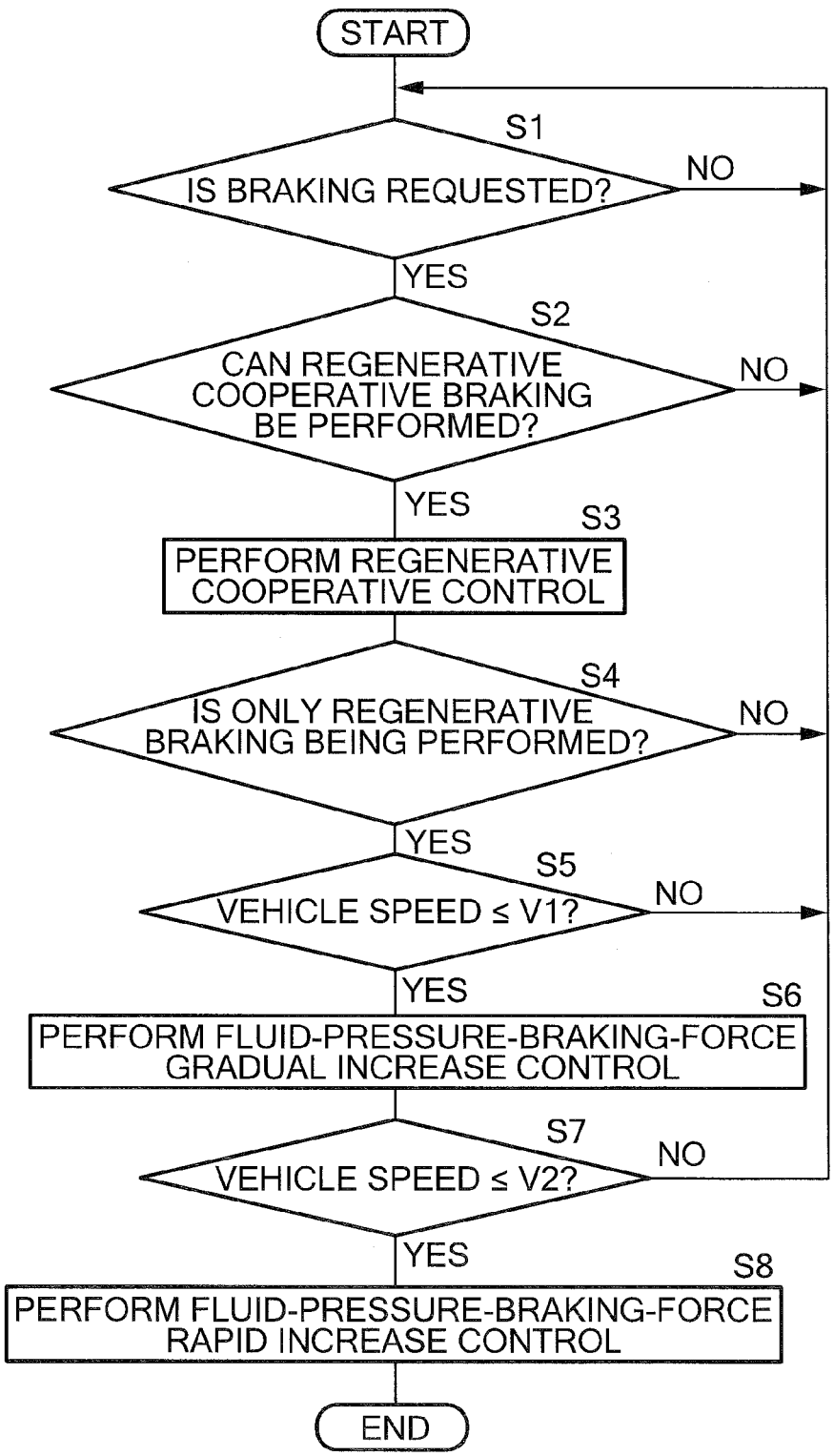

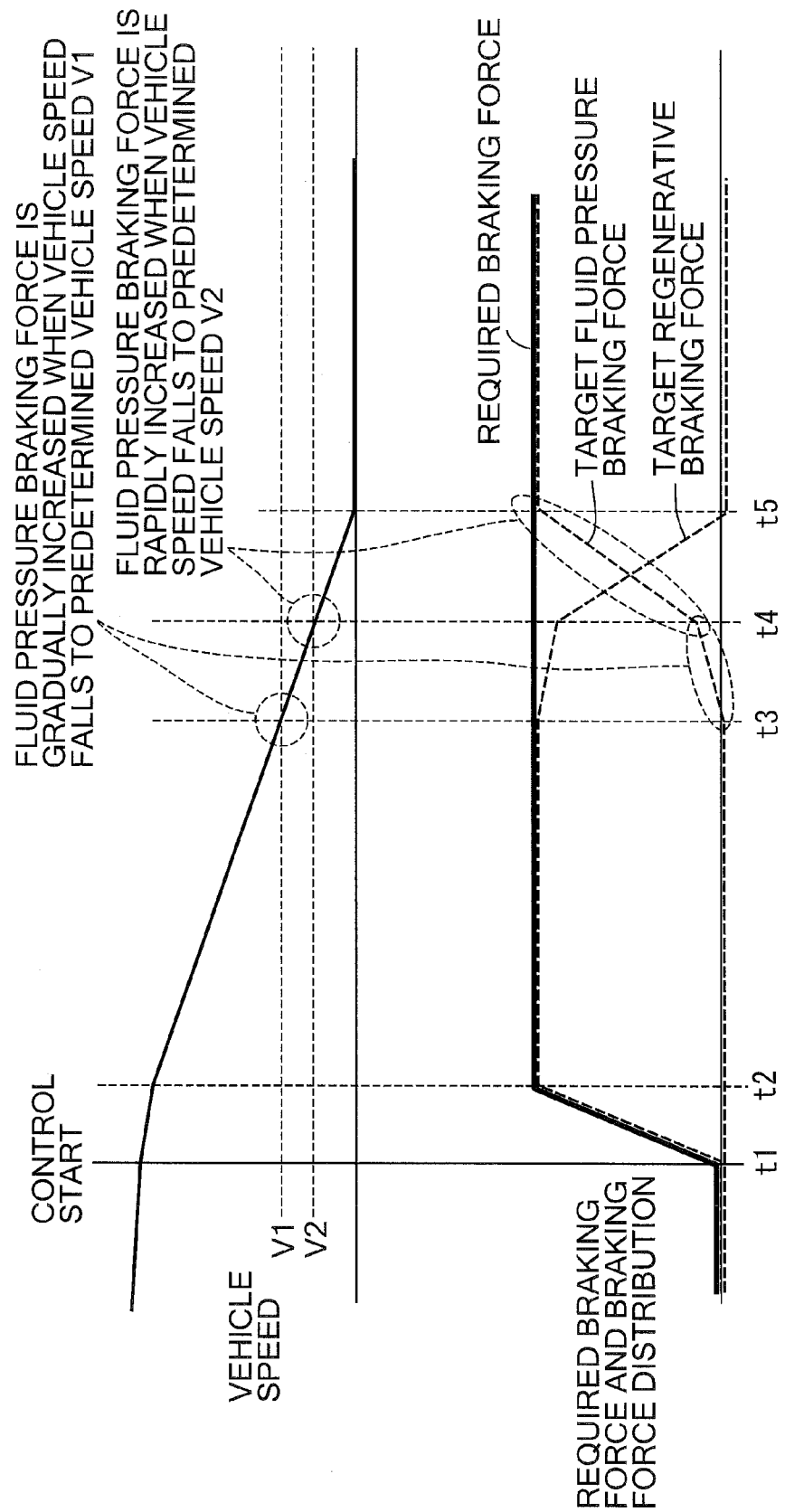

VEHICLE BRAKING DEVICE

TECHNICAL FIELD

The present invention relates to a vehicle braking device which includes a regenerative braking device and a fluid pressure braking device and is capable of performing regenerative braking and fluid pressure braking, and which changes, after braking is started, from the regenerative braking to the fluid pressure braking.

BACKGROUND ART

The following BBW (brake by wire) type brake device is known by Patent Document 1 given below. In the BBW type brake device, an operation of a brake pedal by a driver is converted to an electric signal, and wheel cylinders are operated by a brake fluid pressure generated by a slave cylinder which operates according to the electric signal. A master cylinder that is operated by the brake pedal is provided as a backup for the case in which the slave cylinder fails to operate. While the slave cylinder is operating normally, the brake pedal is allowed to stroke by a stroke simulator absorbing brake fluid delivered by the master cylinder.

Patent Document 1: Japanese Patent Application Laid-open No. 2008-110633

DISCLOSURE OF INVENTION

Problems to be Solved by the Invention

Incidentally, in the case of hybrid vehicles and electric automobiles including a motor generator as a drive source for traveling, the kinetic energy of a vehicle body is recovered as electric energy by regenerative braking of the motor generator. To recover the kinetic energy of the vehicle body efficiently, the regenerative braking needs to be given priority over fluid pressure braking. Regenerative braking is stopped and switched to fluid pressure braking in such a case where a required braking force cannot be produced only by the regenerative braking, a battery may be overcharged, and the regeneration efficiency of the motor generator is decreased due to a decrease in the speed of the vehicle.

If a fluid pressure braking force is caused to rise rapidly at the time of such changing from regenerative braking to fluid pressure braking, especially at the time of the changing when the vehicle speed is slow, a noise saying "guu" (a so-called squeal noise) may occur due to sliding of brake pads and a brake disc, and a passenger may feel uncomfortable.

The present invention has been made in view of the above-described circumstances, and an object thereof is to prevent, at the time of changing from regenerative braking to fluid pressure braking, occurrence of a squeal noise due to the fluid pressure braking.

Means for Solving the Problems

In order to attain the above object, according to a first aspect of the present invention, there is proposed a vehicle braking device which includes a regenerative braking device and a fluid pressure braking device and is capable of performing regenerative braking and fluid pressure braking, and which changes, after braking is started, from the regenerative braking to the fluid pressure braking, characterized in that when a first condition is met after the braking is started, the transition from the regenerative braking to the fluid pressure braking is started so that a fluid pressure braking force is increased from 0 at a first increasing rate, and when a second condition is met after the first condition is met, the fluid pressure braking force is increased at a second increasing rate, which is higher than the first increasing rate.

Furthermore, according to a second aspect of the present invention, in addition to the first aspect, there is proposed the vehicle braking device, wherein the first condition is that a vehicle speed falls to or below a first threshold value after the braking is started.

Moreover, according to a third aspect of the present invention, in addition to the second aspect, there is proposed the vehicle braking device, wherein the second condition is that the vehicle speed further decreases and falls to or below a second threshold value, which is smaller than the first threshold value, after the first condition is met.

Furthermore, according to a fourth aspect of the present invention, in addition to the second aspect, there is proposed the vehicle braking device, wherein the second condition is that a predetermined time period has elapsed after the first condition is met.

Moreover, according to a fifth aspect of the present invention, in addition to the first aspect, there is proposed the vehicle braking device, wherein the fluid pressure braking device includes a slave cylinder for driving a piston by an electric motor, and the slave cylinder is capable of driving the piston at a certain speed corresponding to any of the first and second increasing rates.

Furthermore, according to a sixth aspect of the present invention, in addition to the fifth aspect, there is proposed the vehicle braking device, wherein, before the transition from the regenerative braking to the fluid pressure braking is completed, the slave cylinder is driven by a predetermined amount to cancel out an ineffective stroke of the slave cylinder.

Effects of the Invention

According to the first aspect of the present invention, in changing from the regenerative braking to the fluid pressure braking in response to a decrease of a vehicle speed due to braking, the fluid pressure braking force is increased from 0 at the first increasing rate when the first condition is met, and the fluid pressure braking force is increased at the second increasing rate, which is higher than the first increasing rate, when the second condition is met after the first condition is met. With this configuration, while occurrence of a squeal noise can be prevented by setting the first increasing rate of the fluid pressure braking force at a small value, a required braking force can be generated without any problem by setting the second increasing rate, to be used subsequently thereto, of the fluid pressure braking force at a large value.

Moreover, according to the second aspect of the present invention, the fluid pressure braking force is increased from 0 at the first increasing rate when the vehicle speed falls to or below the first threshold value after the braking is started. Accordingly, the fluid pressure braking can be started in low-vehicle-speed traveling where an energy recovery efficiency of the regenerative braking decreases.

Moreover, according to the third aspect of the present invention, when the vehicle speed further decreases and falls to or below the second threshold value, which is smaller than the first threshold value, after the first condition is met, the fluid pressure braking force is increased at the second increasing rate, which is higher than the first increasing rate. Accordingly, generation of a fluid pressure braking force can be maximized while occurrence of a squeal noise can be prevented.

Moreover, according to the fourth aspect of the present invention, the second condition is defined that the predetermined time period has elapsed after the first condition is met. Accordingly, changing from the first increasing rate to the second increasing rate can be performed at appropriate timing.

Moreover, according to the fifth aspect of the present invention, the fluid pressure braking device includes the slave cylinder for driving the piston by the electric motor, and the slave cylinder is capable of driving the piston at the certain speed corresponding to any of the first and second increasing rates. Accordingly, an increasing rate of the fluid pressure braking force can be regulated accurately compared to a case where the fluid pressure braking device includes a fluid pressure pump.

Moreover, according to the sixth aspect of the present invention, before the transition from the regenerative braking to the fluid pressure braking is completed, the slave cylinder is driven by the predetermined amount. Accordingly, an ineffective stroke of the slave cylinder can be cancelled out to prevent occurrence of a temporary drop of the braking force in changing from the regenerative braking to the fluid pressure braking. This can prevent a decrease of brake feeling.

BRIEF DESCRIPTION OF DRAWINGS

FIG. 3 is a flowchart explaining operations at the time of switching from regenerative braking to fluid pressure braking. (first embodiment)

FIG. 4 is a time chart explaining operations at the time of switching from regenerative braking to fluid pressure braking. (first embodiment)

EXPLANATION OF REFERENCE NUMERALS AND SYMBOLS

38A Piston
38B Piston
52 Electric motor
V1 First threshold value
V2 Second threshold value

BEST MODE FOR CARRYING OUT THE INVENTION

An embodiment of the present invention is explained below based on FIG. 1 to FIG. 4.

First Embodiment

Figure 1:
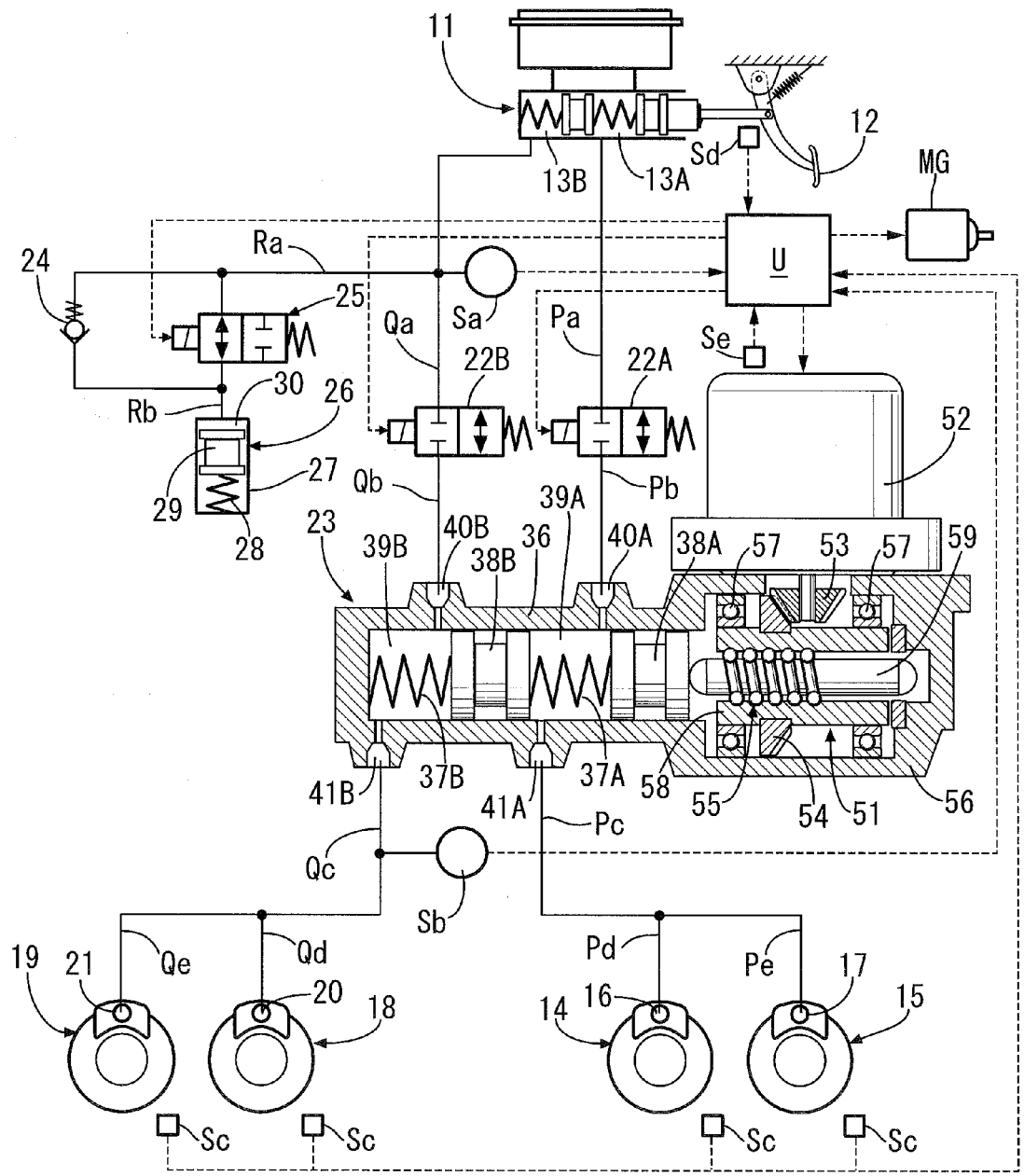
FIG. 1 is a diagram of a fluid pressure circuit of a vehicle braking device under a normal condition. (first embodiment)

As shown in FIG. 1, a tandem-type master cylinder 11 includes a secondary fluid pressure chamber 13A and a primary fluid pressure chamber 13B for outputting a brake fluid pressure corresponding to a tread force applied to a brake pedal 12 by a driver. The secondary fluid pressure chamber 13A is connected to wheel cylinders 16 and 17 of disk brake devices 14 and 15 for a left front wheel and a right rear wheel, for example, through fluid paths Pa, Pb, Pc, Pd and Pe, and the primary fluid pressure chamber 13B is connected to wheel cylinders 20 and 21 of disk brake devices 18 and 19 for a right front wheel and a left rear wheel, for example, through fluid paths Qa, Qb, Qc, Qd and Qe.

An on-off valve 22A, which is a normally open electromagnetic valve, is disposed between the fluid paths Pa and Pb while an on-off valve 22B, which is a normally open electromagnetic valve, is disposed between the fluid paths Qa and Qb, and a slave cylinder 23 is disposed between the fluid paths Pb and Qb and the fluid paths Pc and Qc. Moreover, a stroke simulator 26 is connected to fluid paths Ra and Rb branching from the fluid path Qa leading out of the primary fluid pressure chamber 13B, through a reaction force allowing valve 25, which is a normally closed electromagnetic valve. The stroke simulator 26 is formed by slidably fitting, to a cylinder 27, a piston 29 biased by a simulator spring 28, and a fluid pressure chamber 30 formed on the opposite side of the piston 29 from the simulator spring 28 communicates with the fluid path Rb. A check valve 24 is connected so as to allow brake fluid to flow only from the stroke simulator 26 side to the master cylinder 11 side while bypassing the reaction force allowing valve 25.

An actuator 51 of the slave cylinder 23 includes: a drive bevel gear 53 provided to a rotation shaft of an electric motor 52; a follower bevel gear 54 meshed with the drive bevel gear 53; and a ball screw mechanism 55 operated by the follower bevel gear 54. A sleeve 58 is rotatably supported at an actuator housing 56 by a pair of ball bearings 57 and 57, and an output shaft 59 is disposed coaxially on an inner periphery of the sleeve 58 while the follower bevel gear 54 is fixed to an outer periphery of the sleeve 58.

A secondary piston 38A and a primary piston 38B biased in a rearward direction by a pair of return springs 37A and 37B are slidably disposed in a cylinder main body 36 of the slave cylinder 23, and a secondary fluid pressure chamber 39A is defined in front of the secondary piston 38A and a primary fluid pressure chamber 39B is defined in front of the primary piston 38B. A front end of the output shaft 59 is in contact with a rear end of the secondary piston 38A. The secondary fluid pressure chamber 39A communicates with the fluid paths Pb and Pc through ports 40A and 41A, respectively, and the primary fluid pressure chamber 39B communicates with the fluid paths Qb and Qc through ports 40B and 41B, respectively.

A fluid pressure sensor Sa for detecting a brake fluid pressure generated by the primary fluid pressure chamber 13B of the master cylinder 11 is provided to the fluid path Qa, and a fluid pressure sensor Sb for detecting a brake fluid pressure generated by the primary fluid pressure chamber 39B of the slave cylinder 23 is provided to the fluid path Qc. In addition, to the wheels, vehicle speed sensors Sc . . . for detecting a vehicle speed on the basis of the average value of outputs therefrom are provided, respectively. To the brake pedal 12, a stroke sensor Sd for detecting a stroke of the brake pedal 12 is provided. To the electric motor 52, a current sensor Sd for detecting a current of the electric motor 52 is provided. An electronic control unit U to which signals from the fluid pressure sensors Sa and Sb, the vehicle speed sensors Sc . . . , the stroke sensor Sd and the current sensor Se are inputted controls operations of the on-off valves 22A and 22B, the reaction force allowing valve 25, the electric motor 52 of the slave cylinder 23 and a motor generator MG.

This embodiment is intended for a hybrid vehicle or an electric automobile, and can provide regenerative braking for the driving wheels when the driving wheels are connected to the motor generator MG as well as fluid pressure braking for the four wheels using a brake fluid pressure generated by the slave cylinder 23. The electronic control unit U provides cooperative control of both the regenerative braking by the motor generator MG and the fluid pressure braking by the slave cylinder 23. The electronic control unit U distributes a brake fluid pressure detected by the fluid pressure sensor Sa or a brake fluid pressure corresponding to the stroke by the brake pedal 12 that is detected by the stroke sensor Sd (i.e. a required braking force according to the driver) to a regenerative braking force and a fluid pressure braking force, and controls the regenerative braking force of the motor generator MG and the fluid pressure braking force of the slave cylinder 23 according to the distribution.

Next, descriptions will be given of operation of the fluid pressure braking by the slave cylinder 23.

In a normal state where the system operates normally, the on-off valves 22A and 22B, which are normally open electromagnetic valves, are closed by being excited, and the reaction force allowing valve 25, which is a normally closed electromagnetic valve, is opened by being excited. Upon receipt of an instruction of fluid pressure braking by the electronic control unit U in this state, the actuator 51 of the slave cylinder 23 starts to operate. Specifically, when the electric motor 52 is driven in one direction, the output shaft 59 moves forward by the action of the drive bevel gear 53, the follower bevel gear 54 and the ball screw mechanism 55, and thereby the secondary piston 38A and the primary piston 38B pushed by the output shaft 59 move forward. Since the on-off valves 22A and 22B are closed, a brake fluid pressure is generated in the secondary fluid pressure chamber 39A and the primary fluid pressure chamber 39B immediately after the two pistons 38A and 38B start to move forward. The brake fluid pressures are transmitted to the wheel cylinders 16 and 17; 20 and 21 of the disk brake devices 14 and 15; 18 and 19, to brake the wheels.

At this time, a brake fluid pressure generated by the primary fluid pressure chamber 13B of the master cylinder 11 is transmitted to the fluid pressure chamber 30 of the stroke simulator 26 through the reaction force allowing valve 25 which is opened, thereby moving the piston 29 against the simulator spring 28. This allows the brake pedal 12 to stroke, and can also resolve discomfort of the driver by generating a pseudo pedal reaction force.

In addition, the operation of the actuator 51 of the slave cylinder 23 is controlled so that the brake fluid pressure by the slave cylinder 23 detected by the fluid pressure sensor Sb provided to the fluid path Qc would correspond to a fluid pressure braking force specified by an instruction by the electronic control unit U. In this way, certain braking forces can be generated for the disk brake devices 14 and 15; 18 and 19.

In this embodiment, regenerative braking is given priority over fluid pressure braking. For this reason, when the regeneration efficiency of the motor generator MG decreases due to a decrease in the vehicle speed, the regenerative braking is switched to fluid pressure braking.

Specifically, as shown in a flowchart in FIG. 3, first, when the driver depresses the brake pedal 12 to output a braking request in Step S1, it is judged in Step S2 whether or not regenerative cooperative control can be performed. Specifically, when the battery is not fully charged, regenerative braking by the motor generator MG is possible, and the slave cylinder 23 can operate normally, it is judged in Step S2 that regenerative cooperative control can be performed, and then regenerative cooperative control is performed in Step S3.

At an initial stage of the regenerative cooperative control, only the regenerative braking is performed as described above to efficiently recover the kinetic energy of the vehicle body. Accordingly, the slave cylinder 23 is kept in a non-operating state and hence does not generate any brake fluid pressure. If it is judged in following Step S4 that only regenerative braking is being performed, and the vehicle speed detected by the vehicle speed sensors Sc . . . falls to or below a first threshold value V1, fluid-pressure-braking-force gradual increase control is performed in Step S6.

Specifically, in response to an instruction from the electronic control unit U, the electric motor 52 of the slave cylinder 23 is driven slowly at a certain speed, to increase a brake fluid pressure at a first increasing rate, which is a relatively low rate. Thereby, the secondary piston 38A and the primary piston 38B are caused to advance at a certain speed. In this event, if the electric motor 52 of the slave cylinder 23 is driven rapidly, to increase the brake fluid pressure at a second increasing rate, which is a relatively high rate, a squeal noise may occur at a portion, where brake pads and a brake disc slide with each other, of each of the wheel cylinders 16 and 17; 20 and 21, and a passenger may feel uncomfortable, in some cases. However, setting the first increasing rate at such a small value as no squeal noise would occur can reliably prevent occurrence of a squeal noise.

Thereafter, if the vehicle speed further decreases and falls to or below a second threshold value V2, which is smaller than the first threshold value V1, in Step S7, the electric motor 52 of the slave cylinder 23 is driven at a certain high speed in Step S8, to cause the secondary piston 38A and the primary piston 38B to advance at a certain speed and increase the brake fluid pressure at a second increasing rate, which is higher than the first increasing rate. Here, since the wheel cylinders 16 and 17; 20 and 21 are already in a state of stably generating a braking force, no squeal noise occurs even if the brake fluid pressure is increased rapidly.

As described above, it is possible to generate a required fluid pressure braking force without any problem while preventing occurrence of a squeal noise, by causing the brake fluid pressure to rise at the first increasing rate, which is low, at the initial stage of starting the fluid pressure braking, and, thereafter, to rise at the second increasing rate, which is high. Additionally, by using the slave cylinder 23, which can control the brake fluid pressure at a higher accuracy than that of a fluid pressure pump, a control accuracy in causing the brake fluid pressure to rise at the first increasing rate or the second increasing rate can be increased, and consequently, variations in control force generated by the wheel cylinders 16 and 17; 20 and 21 can be prevented.

This operation will be further described with reference to a time chart in FIG. 4.

When the driver depresses the brake pedal 12 at Time t1, a full regenerative braking mode starts. A required braking force rises from 0 to a predetermined value until Time t2, and then regenerative braking starts. Since the whole of the required braking force is covered by regenerative braking force in the full regenerative braking mode immediately after the starting of the braking, the slave cylinder 23 is in a non-operating state, and generates no fluid pressure braking force.

When the vehicle speed falls to or below the first threshold value V1 at Time t3, the full regenerative braking mode is changed to a first switching mode. In this mode, the slave cylinder 23 operates slowly, so that the fluid pressure braking force increases at the first increasing rate while the regenerative braking force decreases at a first decreasing rate by the amount corresponding to the fluid pressure braking force generated by the slave cylinder 23, until Time t4. Thus, the total braking force is maintained at the required braking force. As shown in the graph of FIG. 4, the first increasing rate and the first decreasing rate are both linear rates. Here, since the first increasing rate at which the fluid pressure braking force increases is set to be relatively low, occurrence of a squeal noise can be reliably prevented.

When the vehicle speed falls to or below the second threshold value V2, which is smaller than the first threshold value V1, at Time t4, the first switching mode is changed to a second switching mode. In this mode, the slave cylinder 23 operates at a high speed, so that the fluid pressure braking force increases at the second increasing rate, which is higher than the first increasing rate, while the regenerative braking force decreases. Thus, the total braking force is maintained at the required braking force. As shown in the graph of FIG. 4, the second increasing rate and the second decreasing rate are also linear rates, each having a steeper slope than the corresponding first increasing rate and the first decreasing rate, respectively. Here, since the wheel cylinders 16 and 17; 20 and 21 are already in an operating state, no squeal noise occurs even if the brake fluid pressure is increased rapidly.

Then, when the vehicle speed falls to 0 at Time t5, the second switching mode is changed to a full fluid pressure braking mode. In this mode, the regenerative braking force falls to 0, and the whole of the required braking force is covered by the fluid pressure braking force. Here, setting the time period from Time t4 to Time t5 to be shorter than the time period from Time t3 to Time t4, can increase the amount of energy to be recovered.

It should be noted that the timing at which the first switching mode is changed to the second switching mode may be defined by a typical lapse time (predetermined time) from Time t3 to Time t4, instead of the vehicle speed V2. In other words, the first switching mode may be changed to the second switching mode when the predetermined time has elapsed since Time t3 when the vehicle speed falls to or below the first threshold value V1 and the full regenerative braking mode is changed to the first switching mode.

Incidentally, before the vehicle speed falls to or below the first threshold value V1 and the regenerative braking is changed to the fluid pressure braking, the secondary piston 38A and the primary piston 38B are caused to advance beforehand by an amount corresponding to an ineffective stroke, by driving slightly the electric motor 52 of the slave cylinder 23 in response to an instruction from the electronic control unit U. An ineffective stroke is a stroke generating no brake fluid pressure in the secondary fluid pressure chamber 39A and the primary fluid pressure chamber 39B due to deformation of cup seals of the slave cylinder 23, deformation of cup seals of the wheel cylinders 16 and 17; 20 and 21, swelling in brake piping caused by a brake fluid pressure, or the like, even when the secondary piston 38A and the primary piston 38B are caused to stroke by driving the electric motor 52 of the slave cylinder 23.

To be more precise, a certain current is supplied to the electric motor 52 according to an instruction from the electronic control unit U, and the electronic control unit U is provided with a feedback of a current detected by the current sensor Se in return. By driving the electric motor 52 with a constant current in this way, a driving force corresponding to a load of driving the slave cylinder 23 can be generated in the electric motor 52 without fail.

Subsequently, an increasing rate of the brake fluid pressure (an increase amount of the brake fluid pressure per unit time) detected by the fluid pressure sensor Sb at the time of starting to supply power to the electric motor 52 is calculated. If it is judged that the increase rate of the brake fluid pressure is below a predetermined value, a setting time for supplying power to the electric motor 52 is increased. If it is judged that the increase rate of the brake fluid pressure is equal to or above the predetermined value, on the other hand, the setting time for supplying the power to the electric motor 52 is decreased. When the setting time for power supply has elapsed, the power supply to the electric motor 52 is stopped. In this way, the electric motor 52 is operated exactly as needed, which can reliably cancel out an ineffective stroke.

In another method of controlling the electric motor 52, a current supplied to the electric motor 52 may be gradually increased until the rotation angle, detected by an unillustrated rotation angle sensor, of the electric motor 52 reaches a rotation angle corresponding to an ineffective stroke. Employing this method can prevent a drastic operation of the electric motor 52 and a noise generated by such an operation, and can also reduce influences of variations in voltage from power supply, temperature changes, aged deterioration of the electric motor 52, and the like. Further, the electric motor 52 is operated exactly as needed, which can reliably cancel out an ineffective stroke.

With this configuration, the slave cylinder 23 can generate a brake fluid pressure immediately after being caused to operate to change from the regenerative braking to fluid pressure braking when the vehicle speed falls to or below the first threshold value V1. This prevents a drop of the brake fluid pressure, and keeps the sum of the regenerative braking force and the fluid pressure braking force to be precisely equal to the required braking force, which prevents deterioration of brake feeling due to a drop of braking force.

Meanwhile, when the slave cylinder 23 becomes inoperable because of loss of power or the like, braking is performed by using a brake fluid pressure generated by the master cylinder 11, instead of the brake fluid pressure generated by the slave cylinder 23. In this case, the regenerative braking by the motor generator MG is stopped, and the whole of the braking force is covered by the braking fluid pressure generated by the master cylinder 11.

Figure 2:
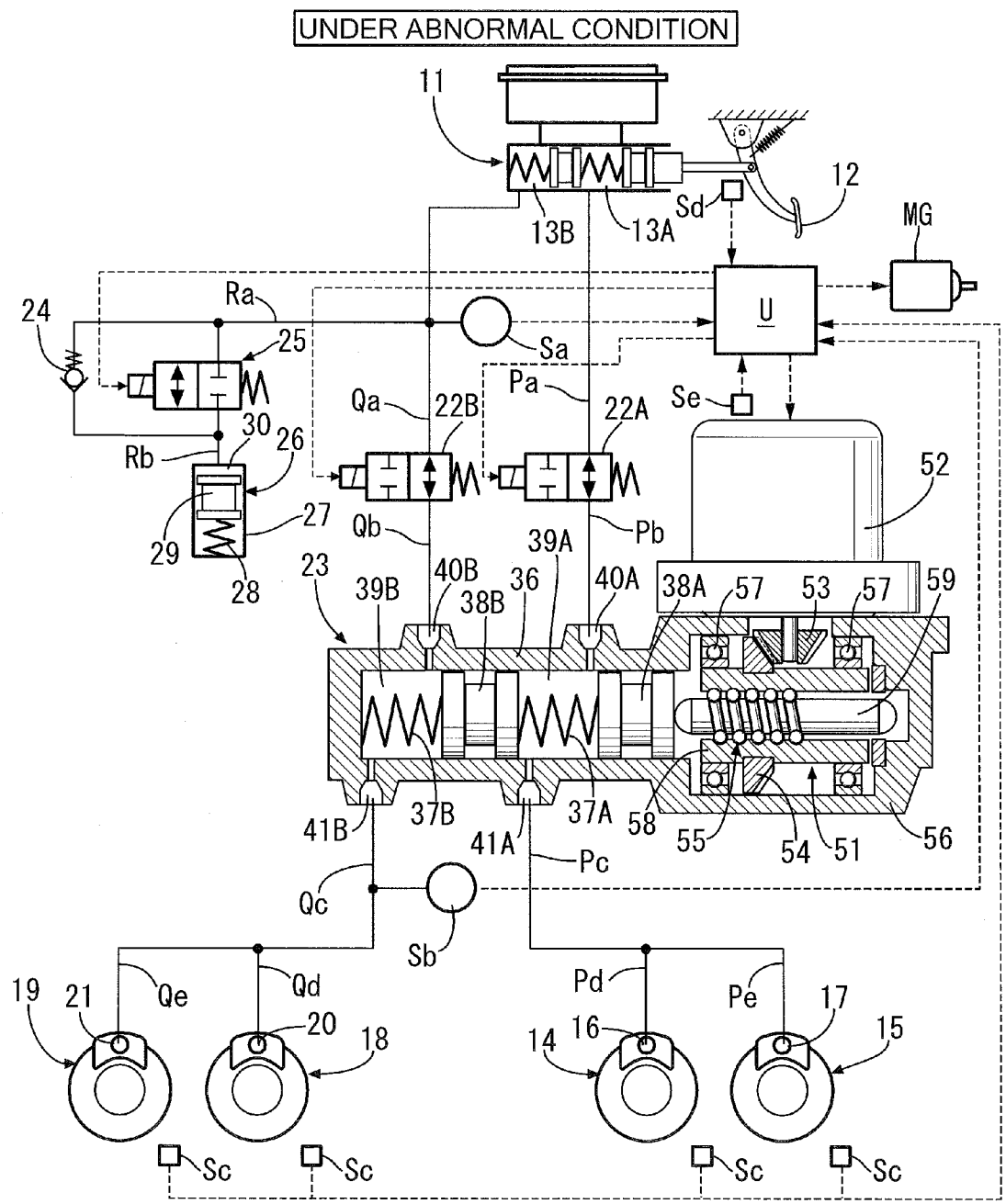
FIG. 2 is a diagram of a fluid pressure circuit of the vehicle braking device under an abnormal condition. (first embodiment)

Specifically, when the power is lost, the on-off valves 22A and 22B, which are normally open electromagnetic valves, are automatically opened, and the reaction force allowing valve 25, which is a normally closed electromagnetic valve, is automatically closed, as shown in FIG. 2. In this state, brake fluid pressures generated in the secondary fluid pressure chamber 13A and the primary fluid pressure chamber 13B of the master cylinder 11 cause the wheel cylinders 16 and 17; 20 and 21 of the disk brake devices 14 and 15; 18 and 19 for the wheels to operate, by passing the secondary fluid pressure chamber 39A and the primary fluid pressure chamber 39B of the slave cylinder 23 without being absorbed by the stroke simulator 26, to generate a braking force without any problem.

If the power is lost in the state where a brake fluid let out from the secondary fluid pressure chamber 13A of the master cylinder 11 when the driver depresses the brake pedal 12 is absorbed by the stroke simulator 26, the reaction force allowing valve 25, which is a normally closed electromagnetic valve, is automatically closed, and thereby the brake fluid is trapped in the fluid pressure chamber 30 of the stroke simulator 26. The brake fluid thus trapped is sent back to the master cylinder 11 side through the check valve 24, thus preventing shift in position of the brake pedal 12 because of a lack of the brake fluid.

An embodiment of the present invention has been described above, but the present invention may be modified in a variety of ways as long as the modifications do not depart from the gist of the present invention.

For example, each of the first threshold value V1 and the second threshold value V2 is set by use of vehicle speed in the embodiment. However, the threshold value may be set by use of wheel speed. In other words, vehicle speed in the invention of the present application includes wheel speed.

Moreover, regenerative braking is terminated when the vehicle speed falls to 0 in the embodiment. However, regenerative braking may be terminated before the vehicle speed falls to 0, and only fluid pressure braking may be performed therefrom until the vehicle speed falls to 0.

Moreover, the slave cylinder 23 is given as an example of means for performing fluid pressure braking in the embodiment. However, any structure may be employed for the means for performing fluid pressure braking, as long as being configured to electrically generate a brake fluid pressure.

Moreover, the wheel cylinders 16 and 17; 20 and 21 are connected directly to the slave cylinder 23 in the embodiment. However, a VSA (vehicle stability assist) system or an ABS (anti-lock brake system) may be provided therebetween.

The invention claimed is:

1. A vehicle braking device which includes a regenerative braking device and a fluid pressure braking device and is capable of performing regenerative braking and fluid pressure braking, and which changes, after braking is started, from the regenerative braking to the fluid pressure braking, wherein:
   when a first condition is met after the braking is started, the transition from the regenerative braking to the fluid pressure braking is started so that a fluid pressure braking force is increased linearly from 0 at a first increasing rate while the regenerative braking is simultaneously decreased linearly at a first decreasing rate, and
   when a second condition is met after the first condition is met, the fluid pressure braking force is increased linearly at a second increasing rate, which is higher than the first increasing rate while the regenerative braking is simultaneously decreased linearly at a second decreasing rate which is greater than the first decreasing rate,
   wherein the first condition is that a vehicle speed falls to or below a first threshold value after the braking is started, and
   wherein the second condition is that the vehicle speed further decreases and falls to or below a second threshold value, which is smaller than the first threshold value, after the first condition is met.

2. The vehicle braking device according to claim 1, wherein
   the fluid pressure braking device includes a slave cylinder for driving a piston by an electric motor, and
   the motor of the slave cylinder is capable of selectively driving the piston at a first speed corresponding to the first increasing rate, and a second speed corresponding to the second increasing rate, wherein the second speed is faster than the first speed.

3. The vehicle braking device according to claim 2,
   wherein the braking device further comprises a pressure sensor for sensing pressure generated by movement of the piston, and an electronic control unit,
   wherein the electronic control unit is operable to detect an ineffective stroke when a change in pressure after movement of the piston by a predetermined distance is below a predetermined value,
   and wherein, when an ineffective stroke is detected, before the transition from the regenerative braking to the fluid pressure braking is completed, the slave cylinder is driven by a predetermined amount to cancel out the ineffective stroke of the slave cylinder.

4. The vehicle braking device according to claim 1, further comprising:
   a master cylinder,
   a slave cylinder comprising a piston and an electric motor configured to selectively drive the piston, and
   a solenoid valve disposed between the master cylinder and the slave cylinder.

5. A vehicle braking device which includes a regenerative braking device and a fluid pressure braking device and is capable of performing regenerative braking and fluid pressure braking, and which changes, after braking is started, from the regenerative braking to the fluid pressure braking, characterized in that
   when a first condition is met after the braking is started, the transition from the regenerative braking to the fluid pressure braking is started so that a fluid pressure braking force is increased linearly from 0 at a first increasing rate while the regenerative braking is simultaneously decreased linearly at a first decreasing rate, and
   when a second condition is met after the first condition is met, the fluid pressure braking force is increased linearly at a second increasing rate which is higher than the first increasing rate while the regenerative braking is simultaneously decreased linearly at a second decreasing rate which is greater than the first decreasing rate,
   wherein the first condition is that a vehicle speed falls to or below a first threshold value after the braking is started, and
   wherein the second condition is that a predetermined time period has elapsed after the first condition is met.

* * * * *